United States Patent
Davidson et al.

(10) Patent No.: US 10,843,267 B2
(45) Date of Patent: Nov. 24, 2020

(54) ADDITIVELY MANUFACTURED HEAT EXCHANGERS

(71) Applicant: Regents of the University of Minnesota, Minneapolis, MN (US)

(72) Inventors: Jane H. Davidson, Wayzata, MN (US); Susan C. Mantell, Saint Paul, MN (US); Brandon J. Hathaway, Minneapolis, MN (US); Kunal Sudam Garde, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 147 days.

(21) Appl. No.: 15/910,459

(22) Filed: Mar. 2, 2018

(65) Prior Publication Data

US 2018/0250747 A1 Sep. 6, 2018

Related U.S. Application Data

(60) Provisional application No. 62/466,465, filed on Mar. 3, 2017.

(51) Int. Cl.
*B22F 3/105* (2006.01)
*F28F 1/10* (2006.01)
(Continued)

(52) U.S. Cl.
CPC ............ *B22F 3/1055* (2013.01); *B33Y 80/00* (2014.12); *F28D 1/05316* (2013.01); *F28D 1/05333* (2013.01); *F28D 1/05366* (2013.01); *F28F 1/10* (2013.01); *F28F 1/32* (2013.01); *F28F 1/34* (2013.01); *F28F 1/40* (2013.01); *F28F 21/081* (2013.01); *B22F 5/10* (2013.01); *B22F 2003/1058* (2013.01); *B22F 2005/004* (2013.01); *B22F 2999/00* (2013.01);
(Continued)

(58) Field of Classification Search
CPC .... F28F 3/025; F28F 3/048; F28F 1/10; F28F 1/32
See application file for complete search history.

(56) References Cited

U.S. PATENT DOCUMENTS 3,257,836 A * 6/1966 Huet .................. B21C 37/15
72/412
5,107,922 A * 4/1992 So ........................ F28F 1/105
165/109.1
(Continued)

OTHER PUBLICATIONS

How to Print Overhangs, Bridges and Exceeding the 45° Rule.*
(Continued)

*Primary Examiner* — Elizabeth J Martin
(74) *Attorney, Agent, or Firm* — Shumaker & Sieffert, P.A.

(57) ABSTRACT

Heat exchangers are manufactured by three-dimensional (3D) printers by printing subsequent layers of a material in a print direction. The heat exchangers include one or more tubes. The one or more tubes are configured to transport a fluid to be heated or cooled. Each of the one or more tubes defines a slope that is within a threshold angle of the print direction. The heat exchangers include a plurality of fins that are each configured to intersect with the one or more tubes while allowing fluid flow between the plurality of fins to heat or cool the fluid. Each fin of the plurality of fins defines a slope that is within a threshold angle of the print direction.

26 Claims, 10 Drawing Sheets

(51) Int. Cl.

| | |
|---|---|
| B33Y 80/00 | (2015.01) |
| F28F 21/08 | (2006.01) |
| F28D 1/053 | (2006.01) |
| F28F 1/40 | (2006.01) |
| F28F 1/34 | (2006.01) |
| F28F 1/32 | (2006.01) |
| B33Y 10/00 | (2015.01) |
| F28D 21/00 | (2006.01) |
| B22F 5/10 | (2006.01) |
| B22F 5/00 | (2006.01) |

(52) U.S. Cl.
CPC ....... *B33Y 10/00* (2014.12); *F28D 2021/0089* (2013.01); *Y02P 10/25* (2015.11)

(56) References Cited

U.S. PATENT DOCUMENTS

| | | | | |
|---|---|---|---|---|
| 2016/0327349 | A1* | 11/2016 | Miller | F28F 9/0204 |
| 2017/0219291 | A1* | 8/2017 | Leemans | B23P 15/26 |
| 2018/0112932 | A1* | 4/2018 | Turney | B33Y 10/00 |

OTHER PUBLICATIONS

"4.3.2.7. Model Constants," Theory Guides, ANSYS Theory Guide, Release 18.1, Standard, RNG, and Relizable K-E Models, 2017, 4 pp. (Applicant points out, in accordance with MPEP 609.04(a), that the year of publication, 2017, is sufficiently earlier than the effective U.S. filing date, 2018, so that the particular month of publication is not in issue.).

"AlSi10Mg-0403 powder for additive manufacturing," Data Sheet, Renishaw, Jul. 2015, 2 pp.

"Delo 100 Motor Oil," Chevron, SAE 40, Jul. 9, 2013, 2 pp.

"EOS Aluminium AlSi10Mg," Material data sheet, EOS, May 2014, 5 pp.

"Standard Methods for Labroratory Airflow Measurement," Ashrae Standard, 41.2, Jun. 28, 1987, 37 pp.

"Welcome to Concept Laser GmbH," Concept Laser, accessed from https://www.concept-laser.de/en/home.html on Jun. 8, 2018, 3 pp.

Arie et al., "Air-Side Heat Transfer Enhancement Utilizing Design Optimization and an Additive Manufacturing Technique," Journal of Heat Transfer, Mar. 2017, vol. 139, ASME, 12 pp.

Assaad et al., "Novel Stacked Wire Mesh Compact Heat Exchangers Produced Using Cold Spray," Apr. 23, 2011, Journal of Thermal Spray Technology, vol. 20(6) 9 pp.

Dupuis et al., "Heat transfer and flow structure characterization for pin fins produced by cold spray additive manufacturing," International Journal of Heat and Mass Transfer, Elsevier, Apr. 1, 2016, 12 pp.

Kirsch et al., "Heat Transfer and Pressure Loss Measurements in Additively Manufactured Wavy Microchannels," Proceedings of ASME Turbo Expo 2016: Turbomachinery Technical Conference and Exposition, Jun. 13-17, 2016, 10 pp.

Kranz et al., "Design guidelines for laser additive manufacturing of lightweight structures in TiAl6V4," Journal of Laser Applications, Laser Institute of America, Feb. 2015, 16 pp.

Launder et al., "The Numerical Prediction of Viscous Flow and Heat Transfer in Tube Banks," Journal of Heat Transfer, ASME, vol. 100, Nov. 1978, 7 pp.

Li et al., "Heat Transfer Enhancement Using Shaped Polymer Tubes: Fin Analysis," Technical Papers, Journal of Heat Transfer, May 4, 2004, 15 pp.

Li et al., "Numerical Simulation of Flow Field and Heat Transfer of Streamlined Cylinders in Crossflow," Proceedings of HT2005, Report to Supercomputer Institute of 2014, Summer Heat Transfer Conference, Jul. 17-22, 2005, 23 pp.

Liu et al., "A comprehensive review on passive heat transfer enhancements in pipe exchangers," Renewable and Sustainable Energy Reviews, Nov. 5, 2012, 18 pp.

Saltzman et al., "Experimental comparison of a traditionally built versus additively manufactured aircraft heat exchanger," American Institute of Aeronautics and Astronautics, ResearchGate, Jan. 2017, 11 pp.

Manglik et al., "Heat Transfer and Pressure Drop Correlations for the Rectangular Offset Strip Fin Compact Heat Exchanger," Experimental Thermal and Fluid Science, Elsevier, Feb. 1995, 10 pp.

Matos et al., "Three-dimensional optimization of staggered finned circular and elliptic tubes in forced convection," International Journal of Thermal Sciences, Elsevier, Oct. 7, 2003, 11 pp.

Norfolk et al., "Solid-State Additive Manufacturing for Heat Exchangers," JOM vol. 67, No. 3, Feb. 4, 2015, 5 pp.

Schmelzle et al., "(Re)Designing for Part Consolidation: Understanding the Challenges of Metal Additive Manufacturing," Journal of Mechanical Design, ASME, vol. 137, Nov. 2015, 12 pp.

Scully, "First Look: 3D-Printed Excavator to Headline IFPE 2017," Hydraulics Pneumatics, Dec. 9, 2016, 6 pp.

Streeter, "Handbook of fluid dynamics," Chapter 3, McGraw Hill, 1961, 7 pp. (Applicant points out, in accordance with MPEP 609.04(a), that the year of publication, 1961, is sufficiently earlier than the effective U.S. filing date, 2018, so that the particular month of publication is not in issue.).

Thomas, "The Development of Design Rules for Selective Laser Melting," Oct. 2009, 318 pp.

* cited by examiner

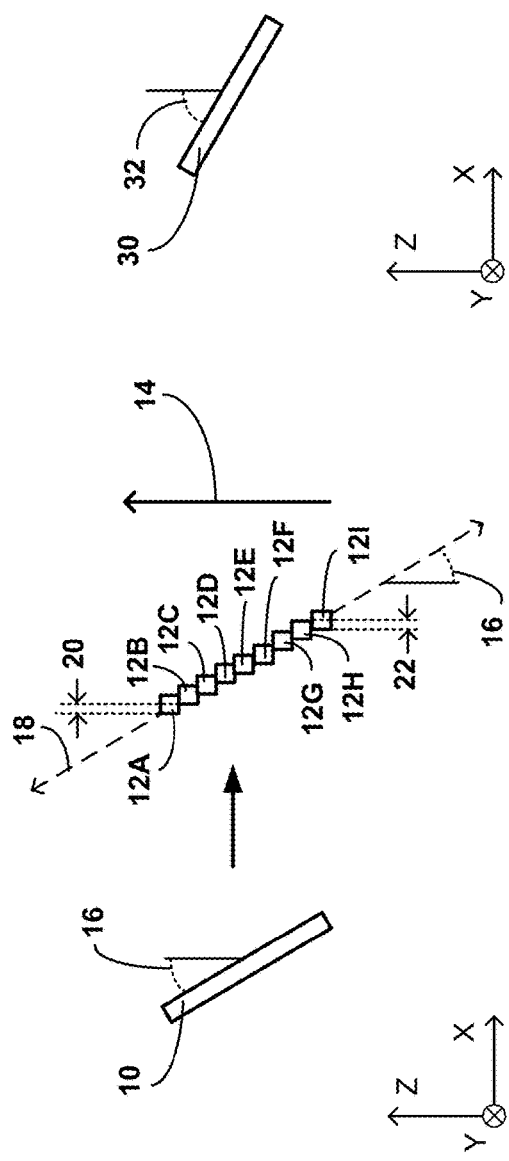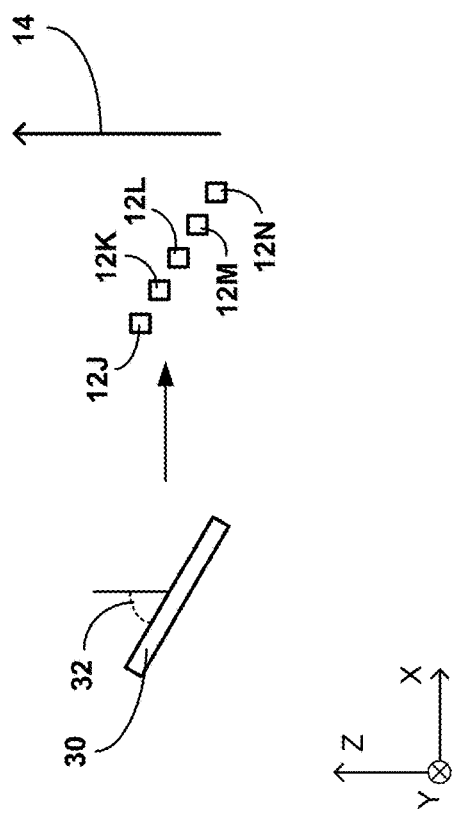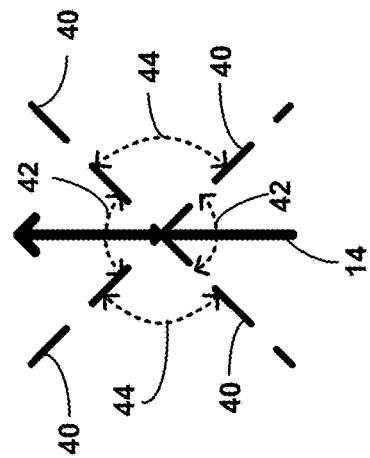

ADDITIVELY MANUFACTURED HEAT EXCHANGERS

This application claims the benefit of U.S. Provisional Application Ser. No. 62/466,465, filed on Mar. 3, 2017, the entire content of which is incorporated herein by reference.

GOVERNMENT INTEREST

This invention was made with government support under EEC-0540834 awarded by National Science Foundation. The government has certain rights in the invention.

BACKGROUND

Heat exchangers are devices used to transfer heat. The heat may be transferred between two fluids configured to flow through the heat exchanger. Alternatively, the heat may be transferred between a fluid configured to flow through the heat exchanger and a solid of the heat exchanger.

SUMMARY

Aspects of the disclosure relate to features that enable three-dimensional ("3D") printing of structures that extend and/or are formed in one or more of a variety of directions or axes without violating various maximum angle thresholds relative to a direction or axis along which the respective 3D printer is configured to print (this direction or axis herein being referred to as a print direction). Some configurations of heat exchangers may facilitate the additive manufacture of these heat exchangers. When configured as described herein, external and internal features of a heat exchanger may be additively manufactured in a single printing operation along one or more print directions. The heat exchangers may include a bank of shaped tubes, offset strip fins on the interior of the tubes, and external sheet fins surrounding the tube bank. In some examples, additively manufactured heat exchangers may undergo one or more operations once formed to be ready for use, such as drilling and tapping threads to allow hose connections, and/or attaching one or more mounting connections.

Disclosed herein is a heat exchanger that is manufactured by a three-dimensional (3D) printer by printing a plurality of layers of a material sequentially along a print direction. The heat exchanger includes one or more tubes. The one or more tubes are configured to transport a fluid to be heated or cooled. Each of the one or more tubes defines one or more slopes that are within a threshold angle of the print direction. The heat exchangers include a plurality of fins that each intersect with the one or more tubes while allowing fluid flow between the plurality of fins to heat or cool the fluid. Each fin of the plurality of fins defines one or more slopes that are within a threshold angle of the print direction.

Disclosed herein is a method of forming a heat exchanger using a three-dimensional (3D) printer that prints a plurality of layers of a material sequentially along a print direction. The heat exchanger formed by the method may include one or more tubes that are configured to transport a fluid to be heated or cooled. Each of the one or more tubes is configured to have one or more slopes that are within a threshold angle of the print direction. Heat exchangers formed by the method may include a plurality of fins that each intersect with the one or more tubes while allowing fluid flow between the plurality of fins to heat or cool the fluid. Each fin of the plurality of fins has one or more slopes that are within a threshold angle of the print direction.

Disclosed herein is a computer-readable storage device comprising instructions that, when executed, configure one or more processors of a storage device to cause a three-dimensional (3D) printer to print a plurality of layers of a material on a plurality of planes to form a heat exchanger substantially similar to the heat exchanger discussed below.

Disclosed herein is a method of forming heat exchangers using three-dimensional (3D) printers that print a plurality of layers of a material along a print direction. The method may include printing a first layer of the material on a first plane at a first set of locations on the first plane. The method may further include printing subsequent layers of the material on subsequent planes along the print direction axis at subsequent sets of locations. The subsequent planes may all be parallel to the first plane. Each location of the sets of locations may be less than a threshold distance away from a location at an immediately preceding set of locations. The threshold distance may be measured along an axis that is perpendicular with the print direction. The first layer and the subsequent layers may form one or more tubes that are configured to transport a fluid to be heated or cooled. The first layer and the subsequent layers may also form a plurality of fins that are each configured to intersect with the one or more tubes while allowing fluid flow between the plurality of fins to heat or cool the fluid.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 1A is a conceptual and schematic illustration of an example feature that defines a slope that can be formed by an example three-dimensional printer printing along the print direction shown in FIG. 1A.

FIG. 1B is a conceptual and schematic illustration of an example feature that defines a slope that cannot be formed by an example three-dimensional printer printing along the print direction shown in FIG. 1B.

FIG. 1C is a conceptual and schematic illustration of a graph illustrating slopes that may be formed by an example three-dimensional printer relative to a print direction.

DETAILED DESCRIPTION

Figure 1D:
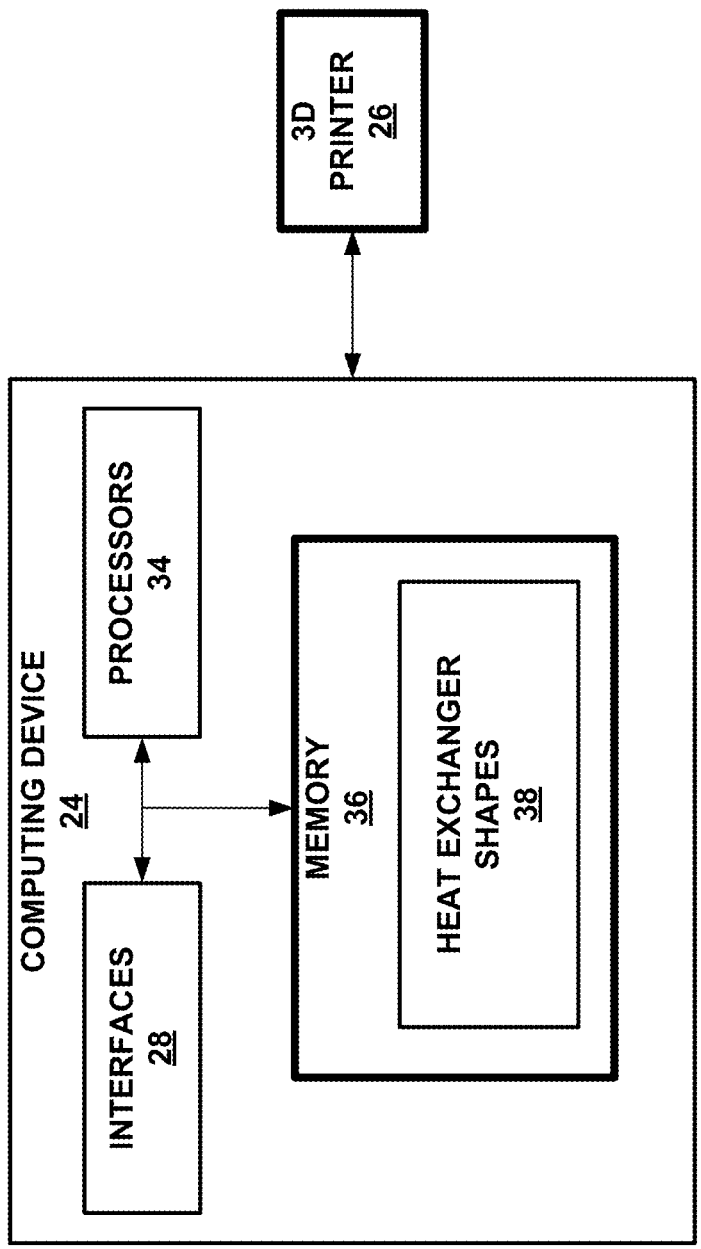
FIG. 1D. is a conceptual and schematic illustration of a block diagram illustrating an example computing device and an example 3D printer configured to additively manufacture a heat exchanger.

Aspects of the disclosure relate to various implementations of heat exchangers manufactured by additive manufacturing using three-dimensional (3D) printers. Heat exchangers may be evaluated based on the amount of heat the heat exchanger is capable of transferring to or from a substance that flows through the heat exchangers. Heat exchangers may be more effective when they transfer greater amount of heat transferred per volume of heat exchanger. Some heat exchangers may include tubes and fins that contain or are otherwise exposed to the flowing fluid. Some heat exchangers may define grid systems in which the tubes and fins run generally perpendicular to each other to transfer this heat to or from the fluid within the heat exchanger. For example, heat from fluid flowing within the tubes may be transferred to fluid flowing around the fins, or vice versa. To effectively transfer heat, heat exchangers may be manufactured from materials that possess a relatively high thermal conductivity, such as certain metals.

Aspects of the disclosure relate to forming heat exchangers with a 3D printer, such as a powder bed selective laser melting (SLM) printer or the like. For example, using a SLM 3D printer, a high-power laser may trace a "slice" of the heat exchanger onto a powder bed of fine grain metal powder particles. The laser may melt and fuse the powder, both in the build plane (x-y plane) and with the previously bonded layer. Upon completion of the layer by layer build of the heat exchanger, the solid metal powder, which surrounds and fills the heat exchanger, may be removed. Accordingly, the heat exchanger may include a port through which powder that is functionally stored "within" the heat exchanger as formed may be removed, such as entry ports (e.g., entry port 62 of FIG. 2B and/or entry port 162 of FIG. 5) or exit ports (e.g., exit port 64 of FIG. 2B and/or exit port 164 of FIG. 5). Additive manufacturing may include creating a 3D object by creating/forming/building one discrete layer of the 3D object at a time. Each layer may include continuous or discontinuous sections of material defining a slice of the 3D object. Each discrete layer defines a relatively flat plane that is substantially parallel to previously deposited layers (as applicable), and further will be parallel to subsequent layers deposited after the discrete layer. Each layer may function as the support for subsequent layers, and each layer is supported by previously formed layers. In some examples, all discrete layers of the 3D object that formed in a single run (e.g., such that the single run results in all of the discrete layers being formed) may define a relatively flat plane, where each of the relatively flat planes are substantially perpendicular to a single axis, this axis hereinafter referred to as a print direction or build axis. Put differently, 3D printers may build or create a 3D object layer-by-layer by forming one or more materials up from a bottom surface to a top surface, where "bottom" and "top" are relative to the build axis/print direction (e.g., the build axis/print direction is oriented from the bottom to the top). As such, in order to manufacture a sloped surface, a 3D printer may deposit material of each layer at selected locations such that the deposited material is offset from the material of the immediately preceding layer. However, if the offset is too great, the underlying layer may not sufficiently support the newly deposited material, and the addition of the material may be unsuccessful, e.g., may result in geometry that deviates from a desired geometry.

For example, as depicted in the conceptual and schematic diagram in FIG. 1A of an example feature 10 as designed and formed, a 3D printer may form feature 10 as a series of formed layers 12A-12I (collectively "layers 12") that together approximate feature 10. FIG. 1A depicts orthogonal x-y-z axes, wherein feature 10 and layers 12 are depicted from ZX plane such that feature 10 and layers 12 extend and/or are formed "out of" or "into" FIG. 1A along Y axis. For example, though feature 10 is depicted as a two-dimensional shape in FIG. 1A for purposes of clarity, feature 10 may be a three-dimensional shape that extends and is formed by a 3D printer across three dimensions as described herein to define slopes and curves and elements in each of the three dimensions. It is to be understood that the general size of layers 12 in relation to feature 10, as well as the shape of layers 12, is depicted for purposes of illustration only, as in other examples layers 12 may be substantially smaller relative to feature 10 and/or may define a different shape than layers 12 of FIG. 1A (e.g., such that each layer is generally the shape of a circle, or some layers 12 are longer than other layers 12 to better approximate feature 10).

As depicted, feature 10 may be a wall or plate that defines a relatively flat surface as viewed along the ZX plane. Feature 10 may be formed by a 3D printer by forming successive layers 12 in print direction 14. As depicted, print direction 14 is substantially parallel with Z axis of FIG. 1A. Feature 10 defines angle 16 relative to print direction 14. The 3D printer may form successive layers 12 to be slightly offset in the x-axis direction from each other as depicted in FIG. 1A, such layers 12 defining plane 18 that is at angle 16 with relation to print direction 14.

Some layers of layers 12 may define overhang 20 with respect to the immediately previous layer of layers 12. Overhang 20 may relate to a different terminal location of two adjacent layers 12 as formed by the 3D printer in a direction perpendicular to print direction 14 (e.g., along X axis). For example, first layer 12A defines overhang 20 with respect to an edge of second layer 12B. First layer 12A may define overhang 20 when first layer 12A extends in a direction perpendicular to print direction 14 away from the shape formed by second layer 12B (e.g., the layer that is supporting the "current" layer). Layers 12 that define overhang 20 may be formed to define less than a threshold overhang 20 with respect to the respective preceding layer of layers 12 (e.g., the layer of layers 12 which the current layer is in contact with). Forming layers 12 to define less than a threshold overhang 20 with respect to the immediately preceding layer of layers 12 may improve a likelihood that an end of the layer of layers 12 that extends away from the immediately preceding layer of layers 12 is supported by the immediately preceding layer of layers 12. If overhang 20 is too great, the underlying layer of layers 12 may not sufficiently support the newly deposited layer of layers 12, and the addition of the newly deposited layer may be unsuccessful, e.g., may result in geometry that deviates from a desired geometry.

Aspects of the disclosure may relate to forming successive layers 12 such that each layer defines at least a threshold amount of overlap 22 with an immediately preceding layer of layers 12. For example, where adjacent layers 12 (e.g., layers 12 that contact each other such that a respective subsequent adjacent layer of layers 12 is directly formed on and secured to a respective preceding adjacent layer of layers 12) both define relatively narrow profiles (e.g., in the x-axis of FIG. 1A), overlap 22 may be equal to at least half of a layer of layers 12. Put differently, overlap 22 may relate to an amount that adjacent layers 12 contact each other, where overhang 20 relates to an amount that adjacent layers 12 do not contact each other adjacent an area of overlap 22. In some examples, overhang 20 and overlap 22 may be related, such that a relatively larger overlap 22 between adjacent layers 12 may enable a relatively larger overhang 20 between the two adjacent layers 12.

In some examples, a 3D printer may be limited in what slope the 3D printer may define as the 3D printer forms subsequent layers, e.g., due to the size of overlap 22. For example, it may be difficult or impossible for the 3D printer to print a feature that approaches a horizontal slope relative to a preceding "lower" surface as it is formed in/along the print direction from this lower layer (e.g., a surface of the layer is perpendicular to the print direction), as there may be little-to-nothing on which to form the feature. One example of this is depicted in the conceptual and schematic diagram of FIG. 1B, which includes an example feature 30 as designed and formed by a 3D printer. A 3D printer may deposit a series of layers 12J-12N (collectively "layers 12") at a plurality of locations that approximate a shape of feature 30. FIG. 1B depicts orthogonal x-y-z axes similar to FIG. 1A, wherein feature 30 and layers 12 are depicted from ZX plane such that feature 30 and layers 12 extend "out of" or "into" FIG. 1B along the Y axis. Further, similar to FIG. 1A, it is to be understood that the general size and shape of layers 12 is depicted for purposes of illustration only, as in other examples layers 12 may be substantially smaller relative to feature 30 and/or may define a different shape than layers 12 of FIG. 1B.

Feature 30 may be a wall or plate, similar to feature 10. Feature 30 may define angle 32 relative to print direction 14. In depositing layers 12 at locations that define angle 32, subsequent layers 12 may have substantially no overlap 22 with respective preceding layers 12. As a result of subsequent layers 12 defining no overlap 22 and being separated in the X-axis direction of FIG. 1B, the generally horizontal feature 30 as depicted in FIG. 1B may not be printable, as subsequent layers 12 are not supported, but rather are unsecured and unrestrained to any surrounding structure upon being formed by the 3D printer.

FIG. 1C depicts a conceptual and schematic diagram of a chart of supportable slopes 42 that are within threshold angle 40 of print direction 14. Aspects of the disclosure relate to configuring and designing components of a heat exchanger such that the components define supported slopes 42 that are no more than threshold angle 40 relative to print direction 14. Put differently, to improve an ability to form a heat exchanger using a 3D printer, features of the heat exchangers are designed to avoid defining unsupported slopes 44 as the features of the heat exchanger are formed along print direction 14 extending away from preceding support layers 12.

Though threshold angle 40 is depicted as being about 45° from print direction 14 in FIG. C for purposes of illustration, threshold angle 40 may be more or less than 45° from print direction 14 in other examples. For example, threshold angle 40 may vary depending upon differing 3D printers or materials used in a 3D printing process, as some 3D printers or some materials may enable a greater range of supported slopes 42. Further, threshold angle 40 may vary depending upon materials with which the object is formed, as some materials may be relatively more adhesive, or may "set" (e.g., harden upon being formed by 3D printer) relatively quicker, or may otherwise define relatively different viscosity or modulus that may enable subsequent layers 12 to be securely formed upon them with different levels of overlap 22. Alternatively, or additionally, threshold angle 40 may be based on a manner in which the heat exchanger is formed, such as a varying threshold angle 40 that changes based on a thickness at which the 3D printer forms each layer of layers 12. For example, though threshold angle 40 is depicted as approximately 45° from the print direction 14 in FIG. 1C, where the material may set faster and may be stronger (e.g., allowing the material to be relatively less supported), the threshold angle may be 60° or more from print direction 14.

As such, it may be difficult or impossible to manufacture examples of heat exchangers that include perpendicular grid-systems using 3D printing. Instead, such heat exchangers must be made by conventional means (e.g., multi-step process of manufacturing each individual component and then assembling all components together, with a failure rate causing defects at each step along the way), which may be slower and more expensive than 3D printing.

Aspects of the disclosure relate to designing portions of heat exchangers so that the portions of the heat exchangers may be manufactured by 3D printers. As discussed above, the heat exchangers may be formed layer by layer, starting with a respective initial layer of layers 12 of a material on a first plane with subsequent layers 12 of the material (or a different material) formed on top of the initial layer in subsequent planes. The material(s) may include a metallic material that is suitable for heat conduction. Each layer of layers 12 may define a surface that is generally perpendicular to print direction 14, and print direction 14 may "point" or otherwise be oriented from an initial layer of layers 12 towards subsequent layers 12. All layers 12 as described herein may be formed in a single "run" of a 3D printer and may define a plane that is substantially perpendicular to print direction 14.

Heat exchangers may include one or more tubes and a plurality of fins. The one or more tubes and the plurality of fins may define supported slopes 42 that are within threshold angle 40 of print direction 14 as tubes and fins form along print direction 14 out from support of preceding layers 12. Configuring heat exchangers to include tubes and fins to define supported slopes 42 that extend out from a support along or within threshold angle 40 of print direction 14 may enable the heat exchangers to be formed by a 3D printer. Support may include a preceding layer of layers 12 upon which a "current" layer of layers 12 is formed. For example, looking to FIG. 1A, layer 12I is support for layer 12H, while layer 12H is support for layer 12G, and so on. Where there is limited amount of space in which a component may angle to define such supported slope 42 (e.g., in the case of fins within tubes), features may be designed to define an extra surface that angles down to the nearest support feature that will itself define supported slope 42.

In some examples, heat exchangers may include a feature with a top/terminating surface that completes a feature while defining a slope that is not within threshold angle 40 (e.g., a top layer 12A that extends in toward a center of an immediately preceding layer 12B to define a slope that is substantially perpendicular to print direction 14). Such a feature may be manufactured by a 3D printer as long as preceding layers 12 of the feature define supported slopes 42 that are within threshold angle 40. Put differently, aspects of the disclosure relate to configuring a heat exchanger that can be manufactured by a 3D printer such that features define supported slopes 42 on "bottom-facing" surfaces of features and substantially only define any unsupported slopes 44 on "top-facing" surfaces of features (where print direction 14 points from a bottom to a top such that top layers 12 are formed after bottom layers 12). As such, in some examples, a heat exchanger may be manufactured by a 3D printer according to a first print direction 14 but may not be configured to be manufactured by the 3D printer according to a second, antiparallel print direction.

Cross-sectional shapes of tubes of the heat exchanger may be configured to enable the tubes to be formed by a 3D printer. In some examples, tubes may have circular cross-sections. In other examples, tubes may define a cross-sectional shape that defines a long axis and a short axis along the longitudinal axis of the tubes where the long axis is aligned. Tubes may define a cross-sectional shape with a long axis and a short axis at least when the longitudinal axis of the tube is substantially perpendicular with print direction 14, such that the long axis of the cross-sectional shape may be substantially parallel with print direction 14. For example, the cross-sectional shape may be a lenticular shape. Tubes with a cross-sectional shape such as a lenticular shape may reduce the difficulty in printing a relatively wide layer of the bottom of a tube.

FIG. 1D is a block diagram illustrating an example computing device 24 and an example 3D printer 26 configured to additively manufacture heat exchangers as described herein. 3D printer 26 may be any 3D printer configured to additively manufacture the heat exchangers described herein, such as a SLM 3D printer. Computing device 24 may include any number of interfaces 28, processors 34, and memory 36 components. Interfaces 28 may enable computing device 24 to communicate with 3D printer 26. In some examples, computing device 24 may utilize interfaces 28 to communicate with 3D printer over a private network (e.g., a wireless local area network) or a public network such as the Internet. Though 3D printer 26 is depicted in FIG. 1D as a separate component than computing device 24, in some examples 3D printer 26 is directly coupled to or incorporated within computing device 24 and accessed using interfaces 28. Interfaces 28 may include one or more network interface cards, such as Ethernet cards, and/or any other types of interface devices that can send and receive information. Any suitable number of interfaces 28 may be used to perform the described functions according to particular needs.

Computing device 24 may include one or more processors 34 configured to implement functionality and/or process instructions. For example, processors 34 may be configured to cause 3D printer 26 to print heat exchangers according to heat exchanger shapes 38 stored in memory 36. Processors 34 may include, for example, microprocessors, digital signal processors (DSPs), application specific integrated circuits (ASICs), field-programmable gate arrays (FPGAs), and/or equivalent discrete or integrated logic circuitry. Though in FIG. 1D processors 34 are depicted as separate from memory 36, in other examples instructions of memory 36 as to heat exchanger shapes 38 described herein may be hard-coded into one or more processors 34

Computing device 24 may include memory 36 configured to store information within computing device 24. Memory 36 may include a computer-readable storage medium or computer-readable storage device. In some examples, memory 36 may include one or more of a short-term memory or a long-term memory. Memory 36 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). In some examples, memory 36 may store logic for execution by one or more processors 34. For example, one or more processors 34 of computing device 24 may use heat exchanger shapes 38 as described herein and stored in memory 36 to cause 3D printer 26 to form heat exchangers 38 as described herein.

Figures 2A, 2B:
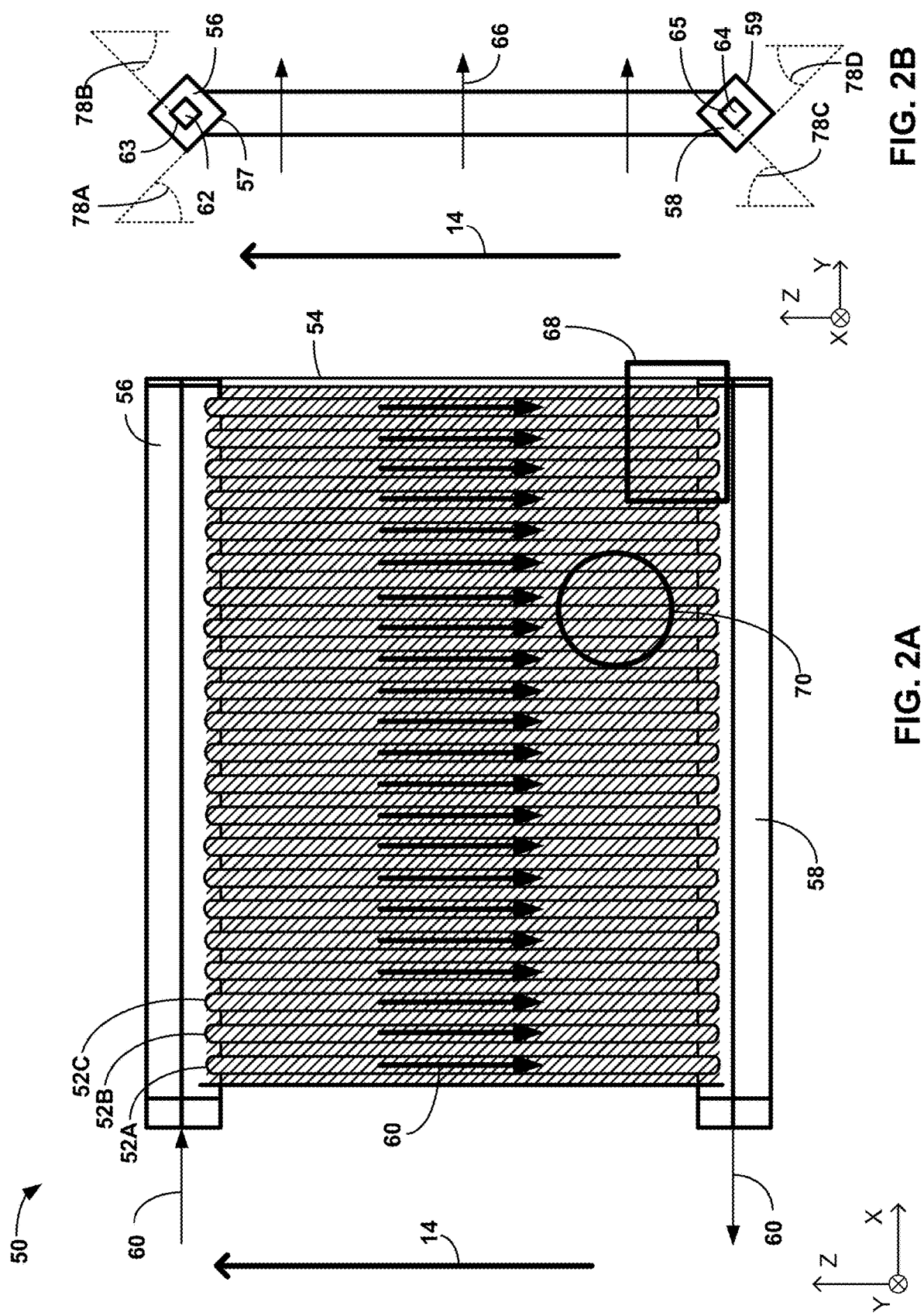
FIG. 2A is a conceptual and schematic diagram of a front view of an example heat exchanger manufactured using a three-dimensional printer such that tubes are generally parallel with the print direction.
FIG. 2B is a conceptual and schematic diagram of a side view of the heat exchanger of FIG. 2A.
Figure 3A:
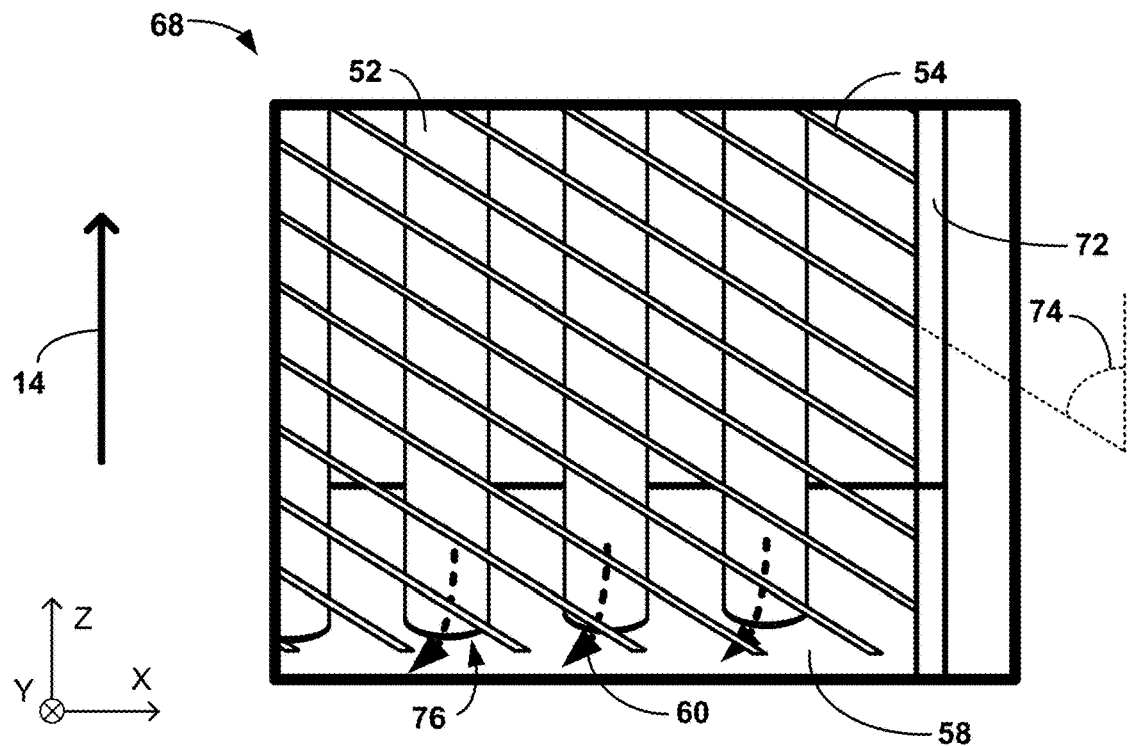
FIG. 3A is a conceptual and schematic diagram of a detail view of a corner of the front of the heat exchanger of FIG. 2A
Figure 3B:
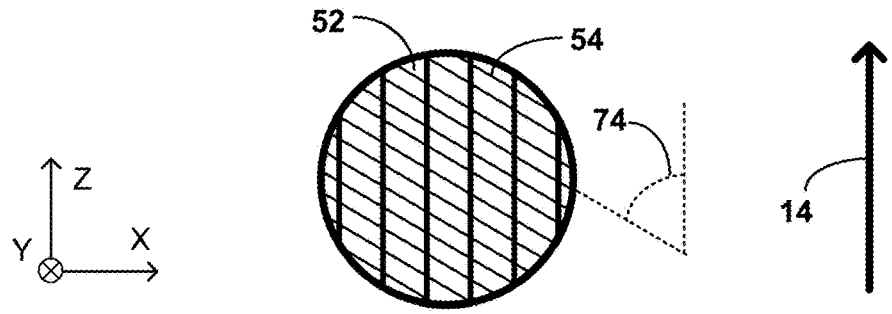
FIG. 3B is a conceptual and schematic diagram of a detail view of the tubes and fins intersecting at the front of the heat exchanger of FIG. 2A.
Figure 3C:
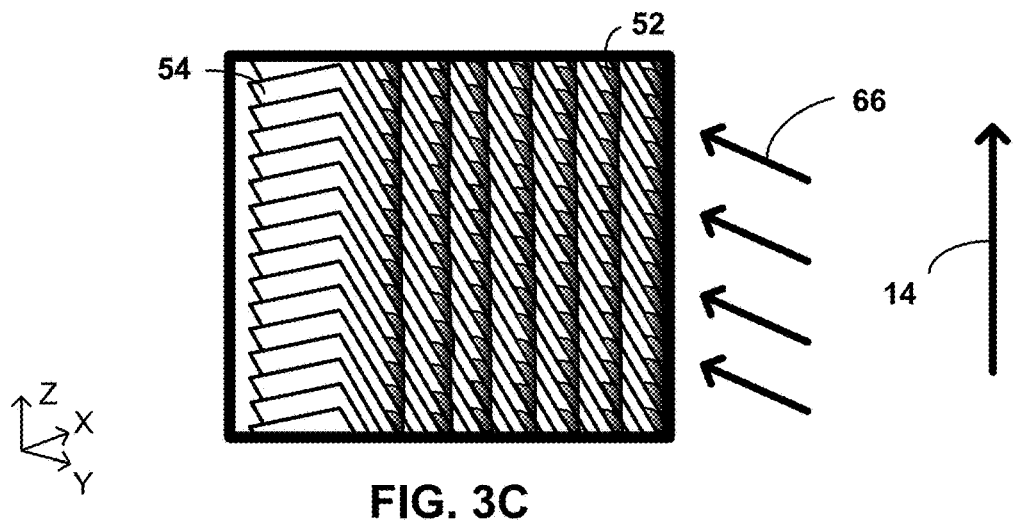
FIG. 3C is a conceptual and schematic diagram of an isometric view of a side of the heat exchanger of FIG. 2A.

FIGS. 2A and 2B depict a front and side view, respectively, of an example heat exchanger 50. FIG. 3A depicts detail view 68 from FIG. 2A and FIG. 3B depicts detail view 70 from FIG. 2A. Heat exchanger 50 of FIGS. 2A and 2B includes one or more tubes 52A-52C (collectively "tubes 52") and a plurality of fins 54. Tubes 52 form or extend between intake manifold 56 and output manifold 58. In some examples, all of heat exchanger 50, including intake manifold 56, tubes 52, plurality of fins 54, and output manifold 58 may be formed using a 3D printer. The particular geometry of heat exchanger 50 of FIGS. 2A and 2B is depicted for purposes of illustration only. In other examples, tubes 52 and/or fins 54 may be relatively larger or smaller or may define a different amount of space between them.

Heat exchanger 50 may be configured to route a first fluid within tubes 52 and route a second fluid among fins 54. The first fluid may be a liquid such as oil and the second fluid may be a gas such as air. For example, a hydraulic oil cooler for a commercial hydraulic excavator was discussed more in reference to "Design and characterization of an additive manufactured hydraulic oil cooler" by Hathaway et al. as available online on Oct. 12, 2017 in the *International Journal of Heat and Mass Transfer*, the entire content of which is incorporated herein by reference. However, heat exchanger 50 may utilize other fluids and/or fluids in other states for both first fluid and second fluid.

The first fluid may flow from intake manifold 56 to output manifold 58 according to flow direction 60. The first fluid may enter intake manifold 56 through entry port 62 and exit output manifold 58 through exit port 64. In other examples, the first fluid may flow in a different manner through tubes 52 and or intake manifold 56 and output manifold 58. For example, the first fluid may enter through output manifold 58 (e.g., through exit port 64 which instead functions as an entry port) and may therein exit through intake manifold 56 (e.g., through entry port 62 which may instead function as an exit port). Additionally, or alternatively, in some examples intake manifold 56 and/or output manifold 58 may internally connect one or more tubes 52 within intake manifold 56 and/or output manifold 58. For example, the first fluid may flow from intake manifold 56 through first tube 52A to output manifold 58, which may then route the first fluid back to intake manifold 56 through second tube 52B via a "U" connection within output manifold 58 between first tube 52A and second tube 52B, which may then route the first fluid back to output manifold 58 through third tube 52C via a "U" connection within intake manifold 56 between second tube 52B and third tube 52C, etc.

Further, as discussed herein, one or both of entry port 62 and/or exit port 64 may be configured to enable excess powder from the SLM printing process contained within heat exchanger 50 to be removed from heat exchanger 50 following the additive building process. For example, one or both of entry port 62 or exit port 64 may be at least 6 millimeters in diameter.

The second fluid may flow from a "front" side of heat exchanger 50 (e.g., the side depicted in FIG. 2A) to a back side of heat exchanger 50 according to flow direction 66. The second fluid may flow past and each fin 54 of heat exchanger 50. In this way, heat may be transferred between the first fluid of tubes 52 to the second fluid flowing between fins 54. For example, the temperature of a first fluid such as oil that flows according to flow direction 60 through tubes 52 may be modulated (e.g., cooled) by a second fluid such as air which flows according to flow direction 66 around tubes 52 and fins 54 connecting tubes 52. Heat exchanger 50 may be configured to facilitate second fluid flow in flow direction 66 that is substantially straight into (e.g., along the Y axis) the view of FIG. 2A, or from the left to the right (e.g., along the Y axis) in FIG. 2B.

Heat exchanger 50 may be partially or entirely formed using a 3D printer in print direction 14. As depicted, tubes 52 are substantially aligned with print direction 14, such that layers 12 of tubes 52 form along print direction 14 defining supported slope 42 that is within threshold angle 40 (FIG. 1). Further, fins 54 may form along print direction 14 defining supported slope 42 that is within threshold angle 40. Each tube 52 and fin 54 of heat exchanger 50 may be formed using a 3D printer. Intake manifold 56 and/or output manifold 58 may likewise be formed using a 3D printer (e.g., during the same "run" or operation which forms tubes 52 and fins 54) as a result of intake manifold 56 and/or output manifold 58 defining bottom-facing angles 78A-78D (collectively "angles 78") that are within threshold angle 40). For example, intake manifold 56 may include a bottom surface 57 of intake manifold 56 and bottom-facing surface 63 of entry port 62 that define angles 78A, 78B, respectively, that are both within threshold angle 40. For another example, output manifold 58 may include a bottom surface 59 of output manifold 58 and bottom-facing surface 65 of exit port 64 that define angles 78C, 78D, respectively, that are both within threshold angle 40.

In other examples, intake manifold 56 and/or output manifold 58 may be manufactured separately from tubes 52 and fins 54, whether in a separate 3D printing operation or using a completely different manufacturing technique. In some such examples, tubes 52 and fins 54 may be formed directly on a surface of output manifold 58 or intake manifold 56. Alternatively, tubes 52 and fins 54 may be formed on a different substrate, after which completed tubes 52 and fins 54 may be secured to output manifold 58 and intake manifold 56 to complete heat exchanger 50.

In some examples, heat exchanger 50 may include support features in order to support fins 54 as fins 54 extend in the diagonal direction relative to print direction 14 as depicted in FIG. 2A. For example, detail view 68 as depicted in FIG. 3A is a conceptual and schematic diagram of fins 54 of heat exchanger 50 supported by sidewall 72. Detail view 68 depicts tubes 52 as extending and/or forming from output manifold 58 and fins 54 as extending and/or forming from output manifold 58 and sidewall 72. Sidewall 72 may be formed from output manifold 58 along print direction 14. Sidewall 72 may be formed by 3D printer at an angle that is less than threshold angle 40 from print direction 14. Other fins 54 may be formed along print direction 14 extending in a diagonal relative to print direction 14 from output manifold 58. In some examples, each fin 54 may define a substantially constant angle 74 with respect to print direction 14 as the respective fin 54 is formed through heat exchanger 50. For example, as depicted by FIG. 3B, fins 54 may define the substantially same angle 74 in a middle portion of heat exchanger 50 as fins 54 upon initially extending from sidewall 72 or output manifold 58.

In certain examples (e.g., where intake manifold 56 and/or output manifold 58 are manufactured separately), tubes 52 may be configured to be received somewhat by upward-facing port 76 of output manifold 58 (e.g., a port that is substantially coaxial with print direction 14). Ports 76 may be configured to receive fluid flow 60 from tubes 52 as depicted in FIG. 2A (though in other examples fluid flow 60 may be reversed and may flow from output manifold 58 through ports 76 to tubes 52). In other examples, tubes 52 may be secured to ports 76 without forming along Z-axis into ports 76. For example, tubes 52 may be formed as being supported by layers 12 of output manifold 58 adjacent ports 76 (e.g., in examples where intake manifold 56, tubes 52, fins 54, and/or output manifold 58 are all formed in a single run or operation by a 3D printer). Alternatively, tubes 52 may be welded, brazed, or otherwise adhered to respective mouths of ports 76 as defined by intake manifold 58.

Fins 54 may define a width (as measured across the Y axis in FIGS. 2A-3B) that measures at least as large as a cross-sectional width of tubes 52 (such cross-sectional widths also measured across the Y axis of FIGS. 2A-3B, and/or measured across both the Y axis and X axis where tubes 52 define substantially circular cross-sections). Put differently, fins 54 may define a width that is at least as great as a width of tubes 52 as both are measured in a direction that is perpendicular to print direction 14. As a result of a cross-sectional width of fins 54 being at least as great as a cross-sectional width of tubes 52, fins 54 may extend around substantially a full circumference of tubes 52 and contact the full outer circumference of tubes 52. For example, FIG. 3C depicts a conceptual and schematic diagram of an isometric view of a side of heat exchanger 50 as fins 54 are formed through heat exchanger 50 intersecting tubes 52. Fins 54 are formed through heat exchanger 50 at angle 74 that is within threshold angle 40 of print direction 14. As depicted, fins 54 may bisect substantially a full outer circumference of tubes.

Figure 4:
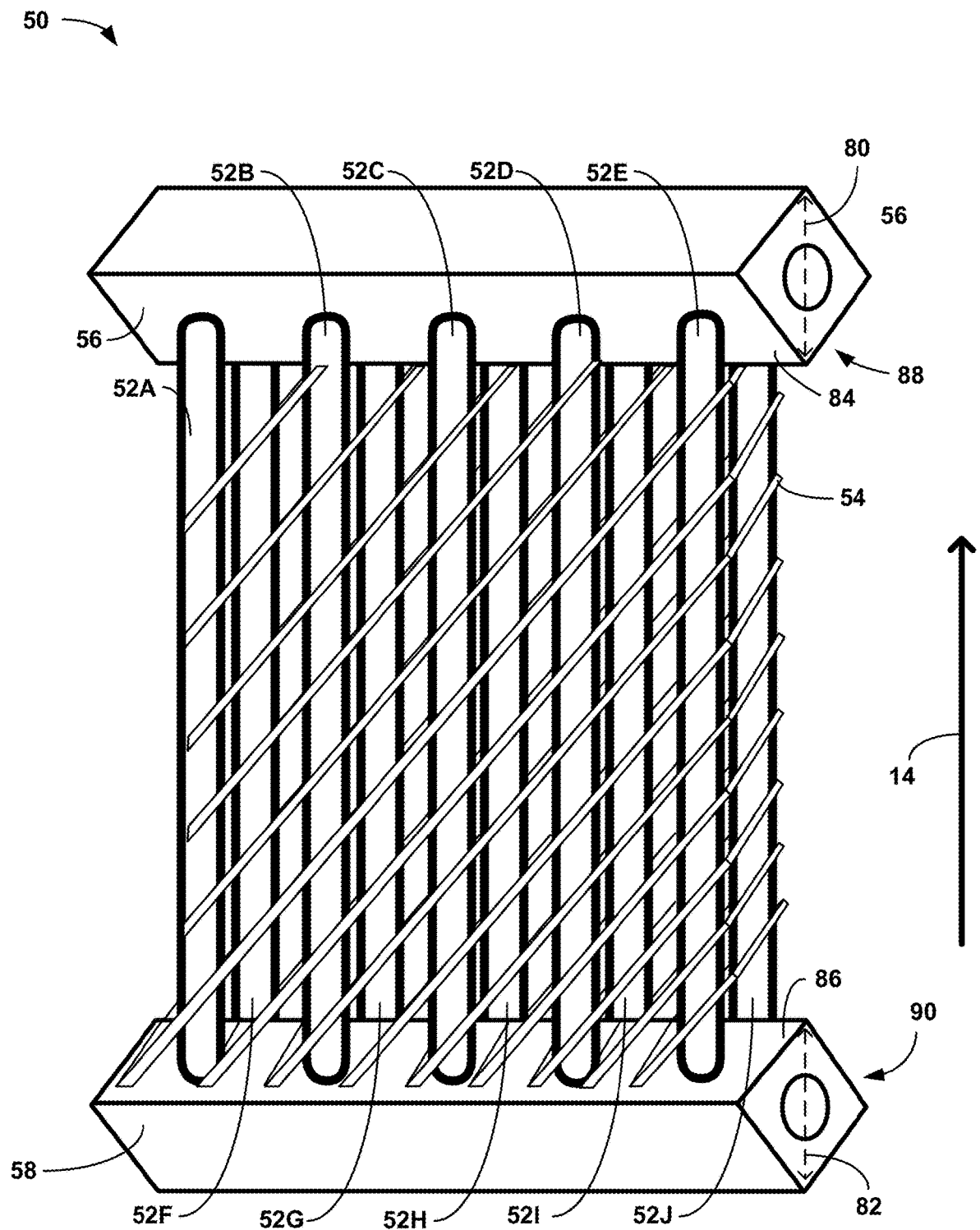
FIG. 4 is a conceptual and schematic diagram of an isometric view of the heat exchanger of FIG. 2A.

In some examples, heat exchangers 50 may include a plurality of rows of tubes 52. For example, each row of tubes 52 may be aligned with a relatively flat plane that is parallel with both print direction 14 and a longitudinal axis of heat exchanger 50. FIG. 4 depicts a conceptual and schematic diagram of isometric views of heat exchanger 50 with two rows of tubes 52. As depicted in FIG. 4, intake manifold 56 and output manifold 58 are both substantially diamond shaped, such that both major axes 80, 82 of both intake manifold 56 and output manifold 58, respectively are substantially aligned with print direction 14. Further, as depicted, when diamond shaped, intake manifold 56 and output manifold 58 may be configured such that each row of tubes 52 is received by a different surface of intake manifold 56 and output manifold 58. For example, first surface 84 of intake manifold 56 and first surface 86 of output manifold 58 may be configured to receive first row or bank of tubes 52A-52E, while a second row or bank of tubes 52 may be received by second surface 88 of intake manifold 56 and second surface 90 of output manifold 58. Second surface 88 of intake manifold 56 may be adjacent to first surface 84 and on opposing side of long axis 80 relative to first surface 84. Similarly, second surface 90 of output manifold 58 may be adjacent to first surface 86 of output manifold 58 and may also be on opposing side of long side relative to first surface 86. In such examples, as depicted, fins 54 of heat exchanger 50 may intersect with both rows of tubes 52.

Figure 5:
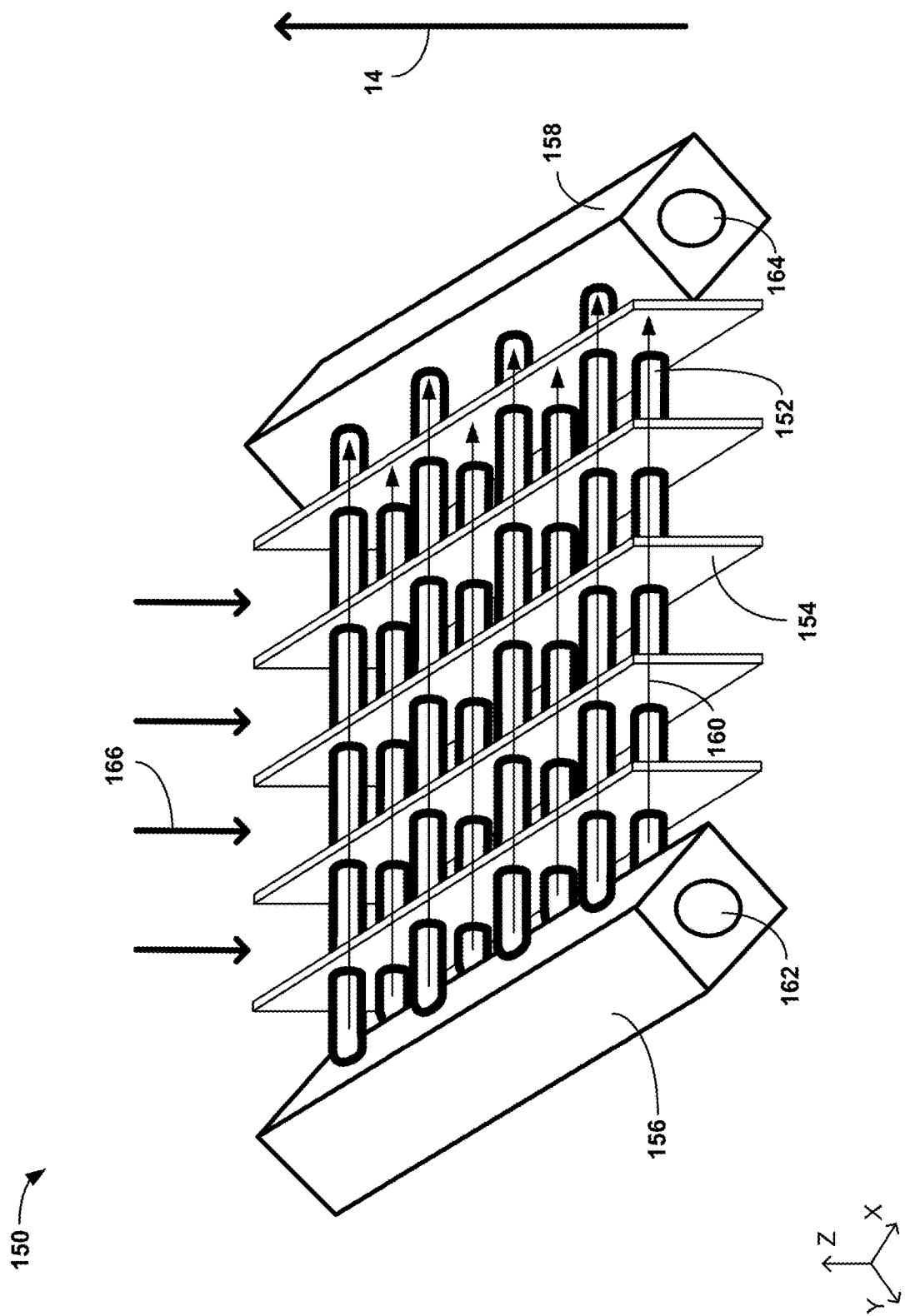
FIG. 5 is a conceptual and schematic diagram of an isometric view of an example heat exchanger with two banks of tubes manufactured using a three-dimensional printer such that long axes of the tubes are generally perpendicular with the print direction.

In some examples, tubes 52 may be formed in a direction that is substantially aligned with print direction 14. In such examples, tubes 52 may define substantially any cross-sectional shape. For example, tubes 52 may define circular or extended circular cross sections (e.g., ovaloid cross-sections). In other examples, tubes 52 may be formed to axially extend at an angle that is generally perpendicular to print direction 14. For example, FIG. 5 depicts a conceptual and schematic diagram of heat exchanger 150 with tubes 152 that extend generally perpendicular to print direction 14 and fins 154 that extend generally aligned with print direction 14. Heat exchanger 150 may include intake manifold 156 and output manifold 158 that may be substantially similar to intake manifold 56 and output manifold 58 with the exception of any differences described herein. Fluid may flow into entry port 162 of intake manifold 156 and follow flow direction 160 through tubes 152 to exit through exit port 164 of output manifold 158. The fluid within intake manifold 156, tubes 152, and output manifold 158 may be a liquid such as oil. Similarly, fluid may follow flow direction 166 through heat exchanger 150 along paths defined by fins 154. The fluid following flow direction 166 defined by fins 154 may be a gas such as air.

Figure 6B:
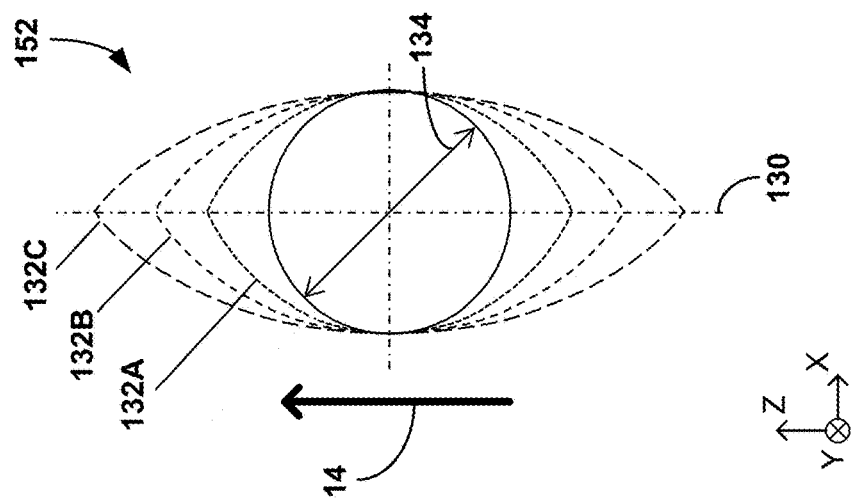
FIG. 6B is a conceptual and schematic diagram illustrating cross-sectional views of example lenticular shapes that can be defined by lenticular tubes of FIG. 6A FIGS. 7A and 7B are conceptual and schematic diagrams illustrating cross-sectional views taken along a plane perpendicular to a longitudinal axis of lenticular tubes with examples of offset strip fins.
Figure 6A:
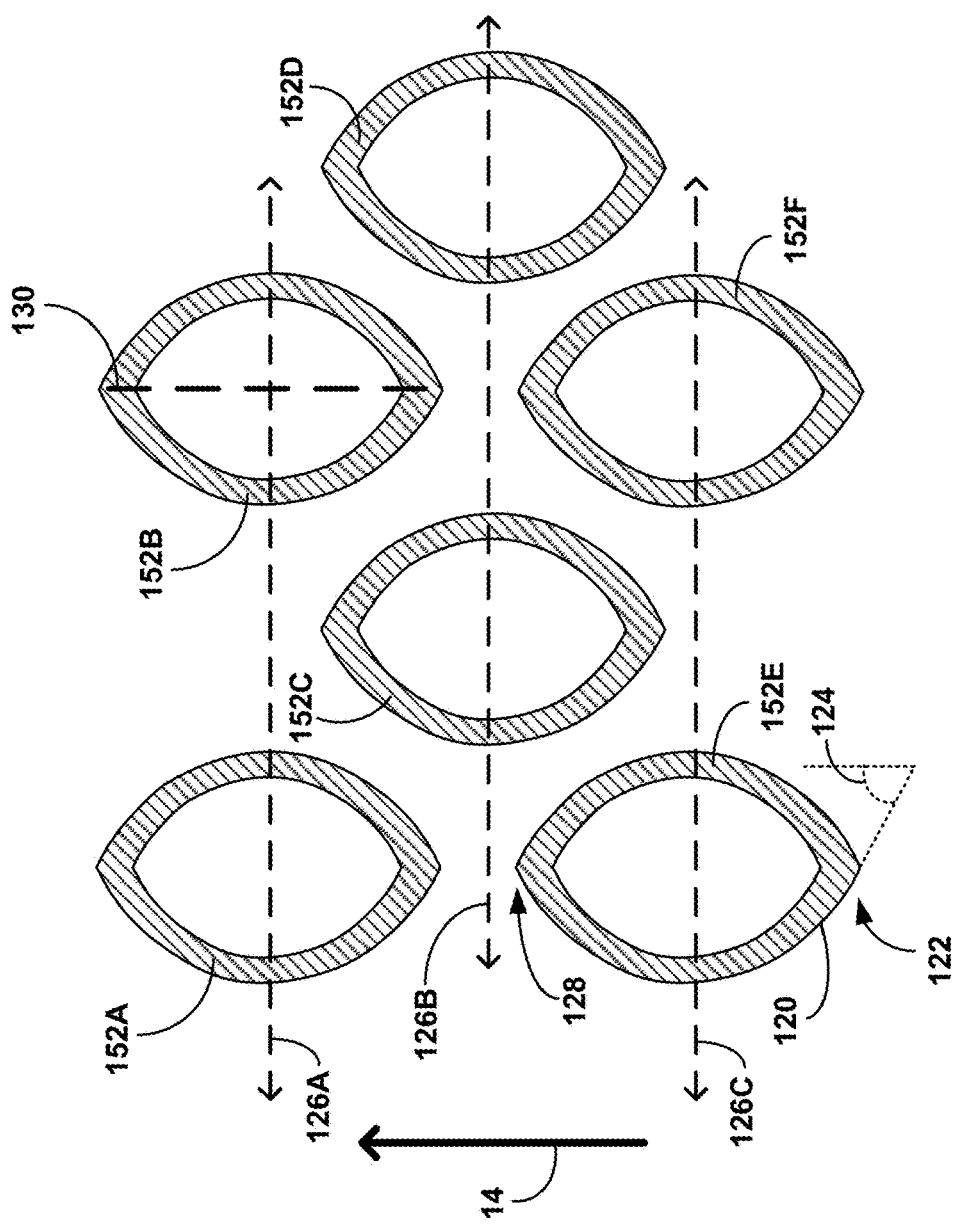
FIG. 6A is a conceptual and schematic diagram illustrating cross-sectional views of lenticular tubes whose long axes are generally perpendicular with the print direction.

In some examples, tubes 152 may define a cross-sectional shape other than circular in order to be produced by a 3D printer. For example, tubes 152 may define a cross-sectional shape that defines bottom-facing surfaces that are within threshold angle 40 of print direction 14 as formed. For example, FIG. 6A depicts a conceptual and schematic diagram of a cross-sectional view of lenticular-shaped tubes 152A-152F (collectively "tubes 152") as formed by a 3D printer. As depicted in FIG. 6A, bottom end 122 of outside surface of tubes 152 may define angle 124 that is within threshold angle 40. Bottom end 122 of tubes 152 may include the first initializing layers 12 formed by a 3D printer in the process of forming tube 152.

In some examples, as depicted, heat exchanger 150 may include three rows 126A-126C (collectively "rows 126") of tubes 152. As depicted, tubes 152 of different rows 126 may be offset, such that respective long axes 130 of tubes of different rows 126 may overlap along print direction 14. In this way, bottom end 122 of tubes 152C, 152D in middle row 126B may be lower as measured along print direction 14 and Z-axis than top end 128 of tubes 152E, 152F in bottom row 126. Put differently, before 3D printer forms top end 128 of tubes 152E, 152F of bottom row, 126, 3D printer may form bottom ends of tubes 152C, 152D of middle row 126B. Configuring tubes 152 to be offset within rows 126 may enable more tubes 152 to fit within a given space of heat exchanger 150. Fitting more tubes 152 within a given space of heat exchanger 150 may enable heat exchanger 150 to exchange a greater amount of heat between fluids of tubes 152 and fluid of fins 154 within a given volume of heat exchanger 150.

The shape of lenticular tubes 152 may change in different examples. FIG. 6B depicts a conceptual and schematic diagram illustrating different examples of shapes 132A-132C (collectively "shapes 132") of lenticular tubes 152. For example, a length of lenticular tubes 152 along long axis 130 may increase or decrease to define different shapes 132.

In some examples, shapes 132 may be constrained by a relatively constant diameter 134 as lenticular tube 152 extends along long axis 130. Each of shapes 132 may define a different ratio between diameter 134 and long axis 130 of tubes 152. For example, shape 132A may define a 0.7 ratio of diameter 134 to long axis 130, while shape 132B defines a 0.5 ratio of diameter 134 to long axis 130, and shape 132C defines a 0.4 ratio of diameter 134 to long axis 130. Lenticular tubes 152 that define a relatively longer length along 130 may result in a lower pressure drop along fluid flow 166 through fins 154. Alternatively, tubes 152 may define diamond or elliptical shapes (not depicted) along the same lines (e.g., such that a major axis of a diamond or elliptical shape is aligned with print direction 14 and bottom-facing surfaces are within threshold angle 40 of print direction 14). Lenticular shapes and the like may increase an outer surface area of tubes 152, therein increasing a possibility of transferring heat through this surface area.

Figure 7A:
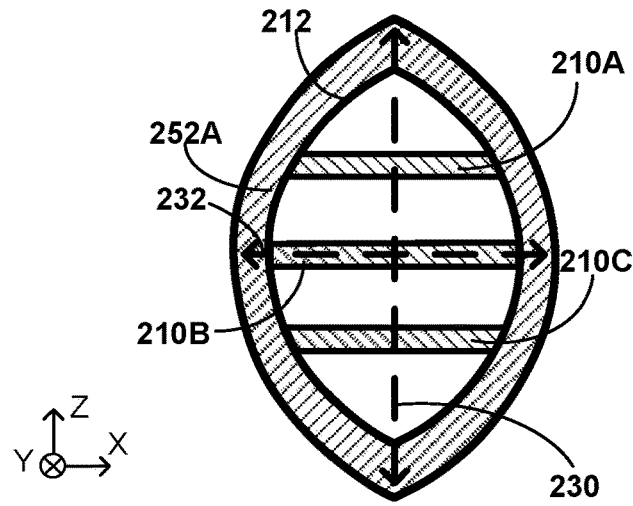
FIG. 7C is a conceptual and schematic diagram illustrating a longitudinal cross-sectional view of a lenticular tube with an example of offset strip fins.
Figure 7B:
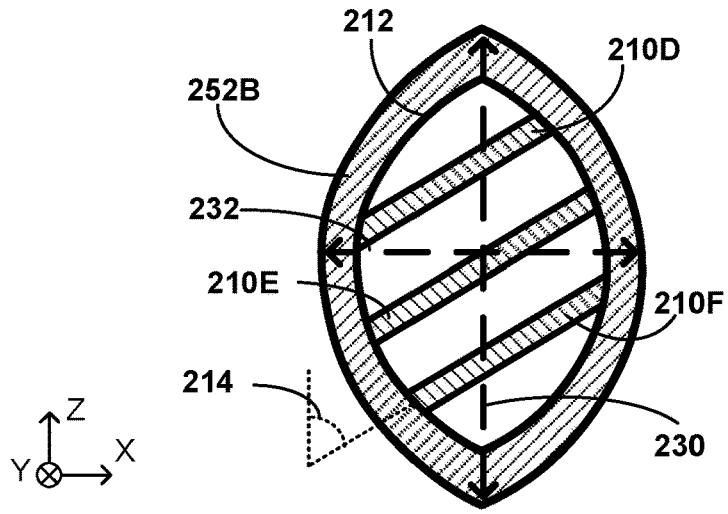
Figure 7C:
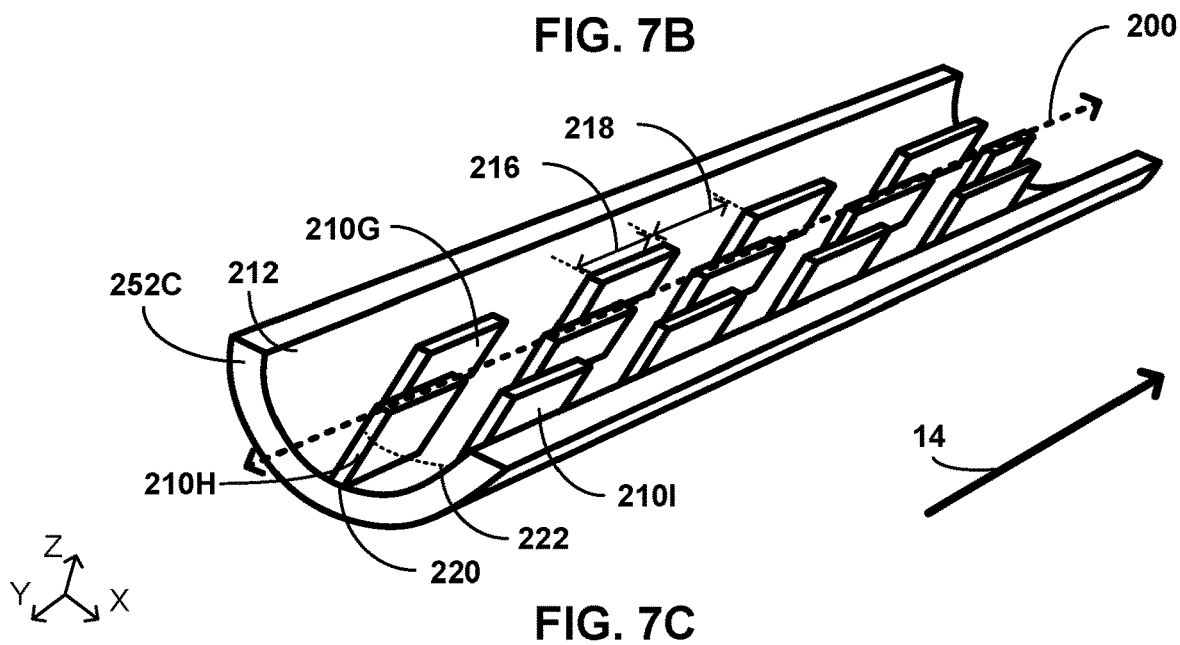

In some examples, inner diameter 134 may be relatively constant in order to define sufficient internal volume of tube 152 to define internal enhancement features within tube 152. Internal enhancement features may include offset strip fins. For example, FIGS. 7A-7C depict conceptual and schematic diagrams of cross-sectional views of example lenticular tubes 252A-252C (collectively "tubes 252") with internal offset strip fins 210A-210I (collectively "strip fins 210") as viewed along longitudinal axis 200 of tubes 252 in FIGS. 7A and 7B and as viewed along the major diameter of lenticular tube 252 in FIG. 7C. Tubes 252 may be substantially similar to tubes 52, 152 described herein, with the exception of any differences below. Tubes 252 may be used in heat exchanger 50 and heat exchanger 150 described herein.

Strip fins 210 may improve an ability for tubes 252 to transfer heat to and from a fluid. For example, where tubes 252 transport a highly viscous fluid such as oil, strip fins 210 may improve an ability for the fluid to flow through tubes 252 according to the desired fluid flow (e.g., such as fluid flow 60 and fluid flow 160) with the desired amount of turbulence, velocity, and general fluid path within tubes 252. Improving the fluid flow through the tubes 252 may improve an ability of a heat exchanger using tubes 252 to exchange heat by enhancing internal-tube-side convective heat transfer. Though strip fins 210 are depicted in lenticular tube 252 in FIGS. 7A and 7B, strip fins 210 may be included in tubes that define other cross-sectional shapes in other examples, such as a circular or ovaloid cross-sectional shape. However, in some examples, lenticular tubes 252 may increase a potential volume that may be used for strip fins 210.

Strip fins 210 may be formed substantially straight between internal walls 212 of tube 252, such that a cross-sectional view of tubes 252 along the longitudinal axis of tubes 252 does depict angles or curves of strip fins 210. Put differently, strip fins 210 may define a substantially flat plane as strip fins 210 extend between internal walls 212 of tube 252.

Each offset fin 210 may be formed along discrete longitudinal length 216 of tubes 252. In some examples, strip fins 210 may axially extend through tubes 252 a substantially uniform length 216 relative to all strip fins 210, such that all of strip fins 210 define a substantially similar longitudinal length 216 through tube 252. Further, each longitudinally adjacent pair of offset pins within a row may be a predetermined axial length 218 away from each other. Put differently, in some examples all strip fins 210 of tube 252 may define a substantially similar axial length 216 and may define a substantially similar axial gap between itself and a respective longitudinally adjacent offset fin 210.

In some examples, tube 252 may include three rows of strip fins 210 as depicted in FIGS. 7A-7C. In other examples, tubes 252 may include more or less rows of strip fins 210. For example, tube 252 may define more or less rows of strip fins 210 in relation to a determined viscosity of the fluid to flow through tube 252 in order to improve the heat transfer ability of tube 252.

Strip fins 210 may be longitudinally offset within tube 252, such that radially adjacent strip fins 210 within tube 252 may instantiate and terminate at different longitudinal locations within tube 252. For example, offset fin 210H may define a first longitudinal end (e.g., an end that is configured to be closer to a first manifold of the respective heat exchanger that includes tube 252C) at first longitudinal location 220, while strip fins 210H, 210I that are radially adjacent offset fin 210H may define respective first longitudinal ends (e.g., ends that are configured to be closer to the same first manifold of the same respective heat exchanger) at second longitudinal location 222.

Strip fins 210 may extend between internal walls 212 in a direction that is substantially parallel to minor axis 232 of tube 252 as depicted in FIG. 7A. In other examples, as depicted in FIG. 7B, strip fins 210 may extend along a different direction between internal walls 212 of tube 252, such as at angle 214 to major axis 230 and/or print direction 14. In certain examples (not depicted), strip fins 210 extend within tube 252 in a direction that is substantially parallel with major axis 230.

Strip fins 210 may define a rectangular shape when extending between internal walls 212 of tubes 252. Put differently, when extending between internal walls 212 of tubes 252, strip fins 210 may define longitudinal ends that extend along a direction that is substantially perpendicular to longitudinal axis 200 of tubes 252. In other examples, strip fins 210 may extend between internal walls 212 in a manner that defines an acute angle relative to longitudinal axis 200 of tubes.

Figure 8A:
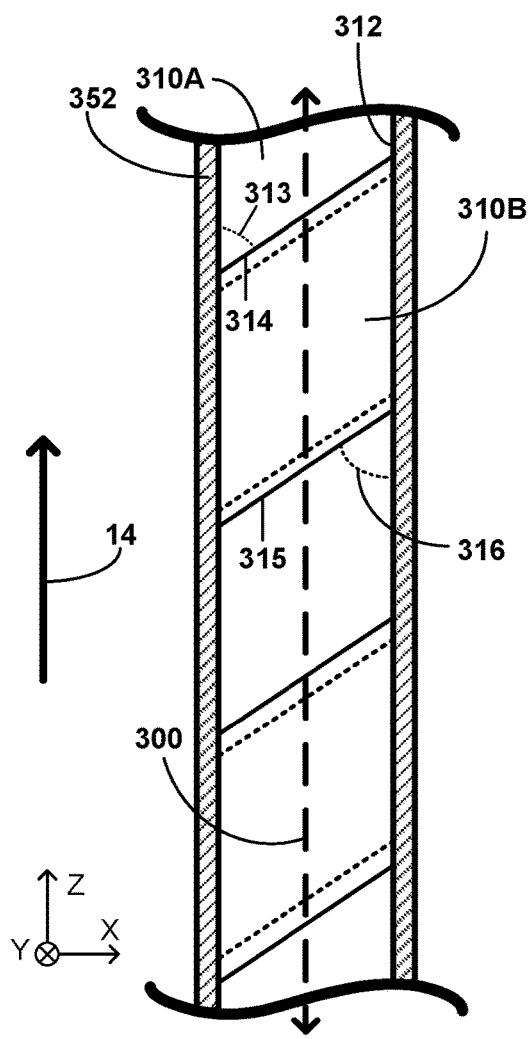
FIGS. 8A and 8B are conceptual and schematic diagrams illustrating longitudinal cross-sectional front and side views, respectively, of an example tube with offset strip fins.
Figure 8B:
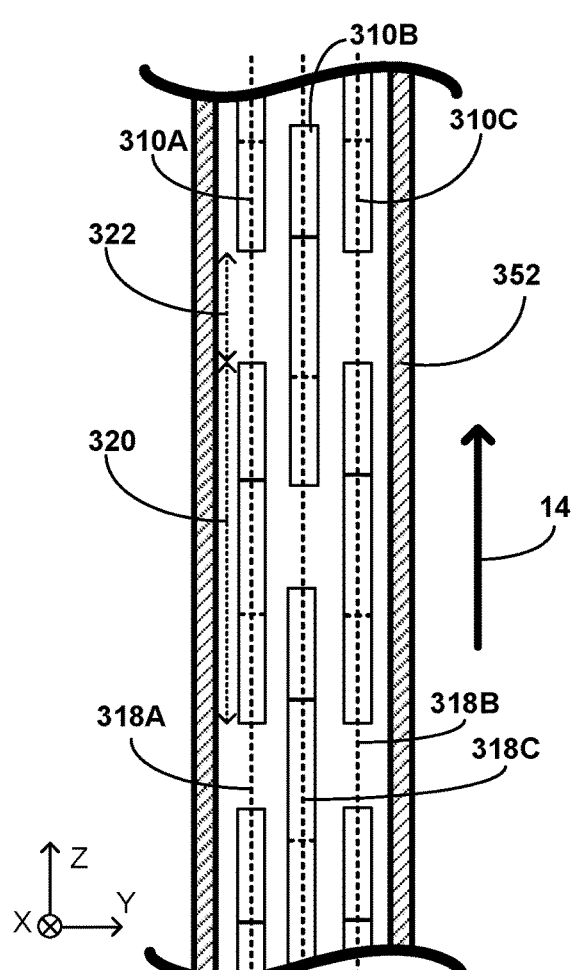

For example, FIGS. 8A and 8B depict a conceptual and schematic diagram illustrating tubes 352 with offset strip fins 310 with angled longitudinal ends 314, 315 as viewed along longitudinal axis 300 from a front and side view of tubes 352. Strip fins 310 may be longitudinally arranged in one or more rows within tubes 352. For example, as depicted in FIGS. 8A and 8B, strip fins 310 are arranged in three rows 318A-318C (collectively "rows 318") that longitudinally extend along tube 352. In some examples, all strip fins 310 may define a substantially similar longitudinal length 320. Further, all strip fins 310 may define a substantially similar longitudinal gap 322 between itself and longitudinally adjacent strip fins 310. Strip fins 310 of rows 318 may be longitudinally offset from each other as described herein. For example, row 318A may be aligned with row 318B, while both row 318A and row 318B are longitudinally offset with row 318C. FIG. 8A includes dotted lines to indicate hidden ends of strips fins 310 of first row 318A that are hidden by second row 318B of strip fins 310.

Bottom-facing longitudinal ends 315 of strip fins 310 may define angle 316 as strip fins 310 extend between internal walls 312 of tube 352. Strip fins 310 may define angle 316 to be within threshold angle 40 of print direction 14, where print direction 14 is substantially aligned with longitudinal axis 300 of tubes (e.g., as in FIGS. 2A-4). By providing a sloped longitudinal end 314 that is within threshold angle 40 of print direction 14, tubes 352 may enable a 3D printer to additively manufacture strip fins 310 from one side of internal walls 312 to the opposing side of internal walls 312. As described further above, internal features such as strip fins 310 may include a top/terminating surface, such as top-facing longitudinal end 314, that completes a feature 310 while defining an angle 313 that is not within threshold print angle (e.g., a top layer 314 that defines a slope that may be substantially perpendicular to print direction 14). Such a feature may be manufactured by a 3D printer as long as preceding layers of the internal feature 310 define supported slopes that are within threshold angle. Put differently, tube 352 of a heat exchanger can be manufactured by a 3D printer such that features 310 define supported angles 316 on "bottom-facing" surfaces 315 of internal features 310, and substantially only define any unsupported angles 313 on "top-facing" surfaces 314 of features 310 (where print direction 14 points from a bottom to a top such that top layers are formed after bottom layers). As such, in some examples, tube 352 may be manufactured by a 3D printer according to a first print direction 14 but may not be configured to be manufactured by the 3D printer according to a second, antiparallel print direction.

Figure 9:
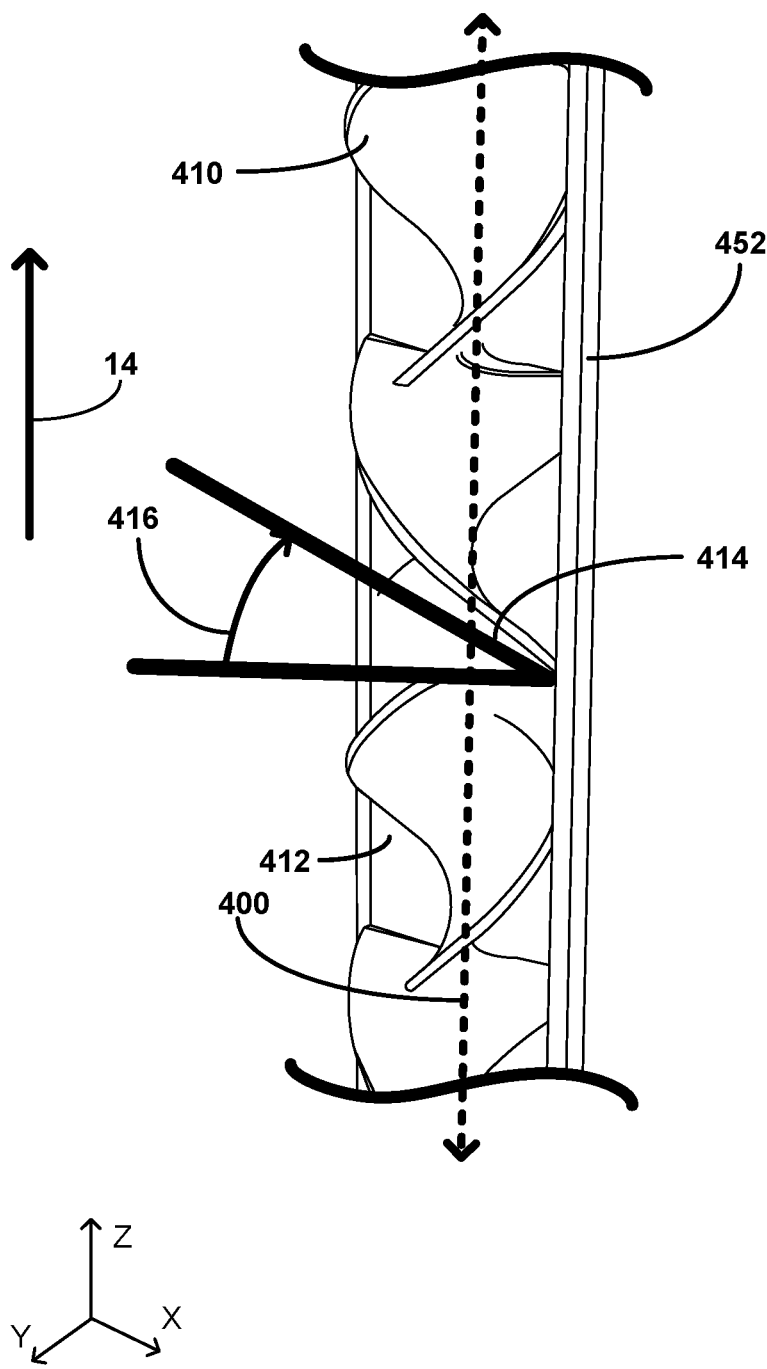
FIG. 9 is a conceptual and schematic diagram illustrating a longitudinal cross-sectional view of an example tube with twisted ribbons.

In some examples, tubes may include angled strip fins that twist as the strip fins are longitudinally formed throughout the tubes. For example, FIG. 9 is a conceptual and schematic diagram illustrating tubes 452 with twisted ribbons 410 with angled longitudinal ends 414 as viewed along longitudinal axis 400. FIG. 9 is depicted with a longitudinal portion of tubes 452 cut away to expose the internal twisted ribbons 410. Longitudinal ends 414 of twisted ribbons 410 may define angle 416 as twisted ribbon 410 extend radially between internal walls 412 of tube 452. Put differently, longitudinal ends 414 of twisted ribbons 410 may contact a first side of internal walls 412 of tubes 412 at a first XY plane and then be formed up along Z axis to terminate at a second XY plane at a second location along the Z axis.

Strip fins 310 may define angle 416 to be within threshold angle 40 of print direction 14, where print direction 14 is substantially aligned with longitudinal axis 400 of tubes (e.g., as in FIGS. 2A-4, 8A, and 8B). By defining sloped longitudinal ends 414 that are within threshold angle 40 of print direction 14, tubes 452 may enable a 3D printer to additively manufacture twisted ribbons 410 from one side of internal walls 412 to the opposing side of internal walls 412.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:

1. A heat exchanger manufactured by a three-dimensional (3D) printer by printing subsequent layers of a material in a print direction, the heat exchanger comprising:
   one or more tubes that are configured to transport a fluid to be heated or cooled, wherein each of the one or more tubes defines a first set of slopes that is within a threshold angle of the print direction, the one or more tubes comprising internal features that define an instantiating slope that is within the threshold angle of the print direction; and
   a plurality of fins that are each configured to intersect with the one or more tubes while allowing fluid flow between the plurality of fins to heat or cool the fluid, wherein each fin of the plurality of fins defines a second set of slopes that is within the threshold angle of the print direction.

2. The heat exchanger of claim 1, wherein:
   each of the one or more tubes includes a first plurality of layers, each of the layers of the first plurality of layers being substantially perpendicular or orthogonal to the print direction, wherein an orientation of each layer of the first plurality of layers relative to adjacent layers of the first plurality of layers defines the first set of slopes as within the threshold angle of the print direction; and
   the plurality of fins includes a second plurality of layers, each of the layers of the second plurality of layers being substantially perpendicular or orthogonal to the print direction, wherein an orientation of each layer of the second plurality of layers relative to adjacent layers of the second plurality of layers defines the second set of slopes as within the threshold angle of the print direction.

3. The heat exchanger of claim 1, further comprising:
   an intake manifold configured to receive the fluid and route the fluid to the one or more tubes to be heated or cooled, wherein the intake manifold is configured to define instantiating slopes that are within the threshold angle of the print direction; and
   an output manifold configured to receive the fluid from the one or more tubes and route the fluid to an output port, wherein the output manifold is configured to define instantiating slopes that are within the threshold angle of the print direction.

4. The heat exchanger of claim 1, wherein the one or more tubes define respective longitudinal axes generally parallel with the print direction and fins of the plurality of fins extend generally diagonal relative to the print direction.

5. The heat exchanger of claim 1, wherein fins of the plurality of fins extend generally parallel with the print direction and the one or more tubes define respective longitudinal axes generally diagonal relative to the print direction.

6. The heat exchanger of claim 1, wherein the one or more tubes have a lenticular cross section in a plane substantially perpendicular to a longitudinal axis of the one or more tubes.

7. The heat exchanger of claim 6, wherein a major axis of the lenticular cross section is generally parallel with the print direction.

8. The heat exchanger of claim 1, wherein a top surface of each of the internal features defines a terminating slope that is beyond the threshold angle of the print direction.

9. The heat exchanger of claim 1, wherein the internal features include one or more offset strip fins.

10. The heat exchanger of claim 1, further comprising a support wall that is generally parallel with the print direction, wherein the support wall is configured to provide a printable support layer for the instantiation of one or more fins of the plurality of fins that extend out from the support wall toward the one or more tubes in a generally diagonal direction relative to the print direction.

11. The heat exchanger of claim 1, wherein the material is metallic and comprises a relatively high thermal conductivity.

12. The heat exchanger of claim 1, wherein the threshold angle is generally 45° from the print direction.

13. A method of forming a heat exchanger using a three-dimensional (3D) printer that prints subsequent layers of a material in a print direction, the method comprising:
   controlling the 3D printer to form, with an additive manufacturing process:
      one or more tubes that are configured to transport a fluid to be heated or cooled, wherein each of the one or more tubes is configured to have one or more slopes that are within a threshold angle of the print direction, the one or more tubes comprising internal features that define an instantiating slope that is within the threshold angle of the print direction; and
      a plurality of fins that are each configured to intersect with the one or more tubes while allowing fluid flow between the plurality of fins to heat or cool the fluid, wherein each fin of the plurality of fins is configured to have slopes that are within the threshold angle of the print direction.

14. The method of claim 13, wherein:
   each of the one or more tubes includes a first plurality of layers, each of the layers of the first plurality of layers being substantially perpendicular or orthogonal to the print direction, wherein an orientation of each layer of the first plurality of layers relative to adjacent layers of the first plurality of layers defines the first set of slopes as within the threshold angle of the print direction; and
   the plurality of fins includes a second plurality of layers, each of the layers of the second plurality of layers being substantially perpendicular or orthogonal to the print direction, wherein an orientation of each layer of the second plurality of layers relative to adjacent layers of the second plurality of layers defines the second set of slopes as within the threshold angle of the print direction.

15. The method of claim 13, further comprising:
printing, by the 3D printer, an intake manifold configured to receive the fluid and route the fluid to the one or more tubes to be heated or cooled such that instantiating slopes of the intake manifold defines are within the threshold angle of the print direction; and
printing, by the 3D printer, an output manifold configured to receive the fluid from the one or more tubes and route the fluid to an output port such that instantiating slopes of the output manifold are within the threshold angle of the print direction.

16. The method of claim 13, further comprising:
printing, by the 3D printer, the one or more tubes in a generally parallel direction relative to the print direction; and
printing, the 3D printer, fins of the plurality of fins in a generally diagonal direction relative to the print direction.

17. The method of claim 13, further comprising:
printing, by the 3D printer, fins of the plurality of fins in a generally parallel direction relative to the print direction; and
printing, by the 3D printer, the one or more tubes in a generally diagonal direction relative to the print direction.

18. The method of claim 13, further comprising printing, by the 3D printer, the one or more tubes to define a lenticular cross section in a plane perpendicular to a longitudinal axis of the one or more tubes.

19. The method of claim 18, further comprising printing, by the 3D printer, a long axis of the lenticular cross section in a generally parallel direction relative to the print direction.

20. The method of claim 13, further comprising printing, by the 3D printer, the internal features such that a top surface of each of the internal features defines a terminating slope that is beyond the threshold angle of the print direction.

21. The method of claim 13, wherein the internal features include one or more offset strip fins.

22. The method of claim 13, further comprising printing, by the 3D printer, a support wall that is that is generally parallel with the print direction, wherein the support wall is configured to provide a printable support layer for the instantiation of one or more fins of the plurality of fins that extend out from a single side of the support wall in a diagonal relative to the print direction.

23. The method of claim 13, wherein the material is metallic and is configured for relatively high thermal conductivity.

24. A computer-readable storage device comprising instructions that, when executed, configure one or more processors of a storage device to:
control a three-dimensional (3D) printer to print a plurality of subsequent layers of a material on a plurality of planes to:
form one or more tubes that are configured to transport a fluid to be heated or cooled, wherein each of the one or more tubes is configured to have one or more slopes that are within a threshold angle of the print direction, the one or more tubes comprising internal features that define an instantiating slope that is within the threshold angle of the print direction;
form a plurality of fins that are each configured to intersect with the one or more tubes while allowing fluid flow between the plurality of fins to heat or cool the fluid, wherein each fin of the plurality of fins is configured to have slopes that are within the threshold angle of the print direction;
form an intake manifold configured to receive the fluid and route the fluid to the one or more tubes to be heated or cooled such that instantiating slopes of the intake manifold defines are within the threshold angle of the print direction; and
form an output manifold configured to receive the fluid from the one or more tubes and route the fluid to an output port such that instantiating slopes of the output manifold are within the threshold angle of the print direction.

25. A method of forming a heat exchanger using a three-dimensional (3D) printer that prints subsequent layers of a material along a print direction axis, the method comprising:
printing a first layer of the material on a first plane at a first set of locations on the first plane; and
printing subsequent layers of the material on subsequent planes along the print direction axis at subsequent sets of locations, wherein the subsequent planes are all parallel to the first plane, wherein each location of the sets of locations is less than a threshold distance away from a location at an immediately preceding set of locations, wherein the threshold distance is measured along an axis that is parallel with the print direction,
wherein the first layer and the subsequent layers form one or more tubes that are configured to transport a fluid to be heated or cooled, the one or more tubes comprising internal features that define an instantiating slope that is within the threshold angle of the print direction, and a plurality of fins that are each configured to intersect with the one or more tubes while allowing fluid flow between the plurality of fins to heat or cool the fluid.

26. A heat exchanger manufactured by a three-dimensional (3D) printer by printing subsequent layers of a material in a print direction, the heat exchanger comprising:
one or more tubes that are configured to transport a fluid to be heated or cooled, the one or more tubes comprising internal features that define an instantiating slope that is within the threshold angle of the print direction; and
a plurality of fins that are each configured to intersect with the one or more tubes while allowing fluid flow between the plurality of fins to heat or cool the fluid, wherein each fin of the plurality of fins defines a slope that is within the threshold angle of the print direction, wherein at least one tube of the one or more tubes is configured to be generally perpendicular to the print direction, wherein a subset of fins of the plurality of fins intersect with the at least one tube, wherein each fin of the subset of fins are within a threshold distance of other fins of the subset of fins, wherein the threshold distance is configured to provide support for the at least one tube.

* * * * *